US012695080B2

(12) United States Patent
Park et al.

(10) Patent No.: US 12,695,080 B2
(45) Date of Patent: Jul. 28, 2026

(54) BATTERY CELL AND COMPONENTS THEREOF

(71) Applicant: Rivian IP Holdings, LLC, Irvine, CA (US)

(72) Inventors: Ki Tae Park, Santa Clara, CA (US);
Soo Kim, Fremont, CA (US);
Hyuksang Park, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 878 days.

(21) Appl. No.: 17/707,472

(22) Filed: Mar. 29, 2022

(65) Prior Publication Data

US 2023/0317913 A1     Oct. 5, 2023

(51) Int. Cl.
*H01M 4/04*          (2006.01)

(52) U.S. Cl.
CPC ......... *H01M 4/0404* (2013.01); *H01M 4/043* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2007/0248745 A1* | 10/2007 | Wakai | ................. | H01M 4/8882 |
| | | | | 427/10 |
| 2010/0319172 A1* | 12/2010 | Buiel | .................... | H01M 10/12 |
| | | | | 29/2 |
| 2012/0052378 A1* | 3/2012 | Torata | .................... | H01M 4/78 |
| | | | | 429/234 |
| 2012/0219817 A1* | 8/2012 | Konishi | .................... | C22F 1/04 |
| | | | | 29/17.2 |
| 2015/0336803 A1* | 11/2015 | Moon | ................... | H01M 4/525 |
| | | | | 252/182.1 |
| 2016/0126541 A1* | 5/2016 | Goto | ..................... | H01M 4/485 |
| | | | | 205/57 |
| 2019/0245249 A1* | 8/2019 | Otohata | ............ | H01M 10/0585 |
| 2020/0028200 A1* | 1/2020 | Sauerteig | .......... | H01M 10/0525 |
| 2020/0203712 A1 | 6/2020 | Park et al. | | |

FOREIGN PATENT DOCUMENTS

| | | | | | |
|---|---|---|---|---|---|
| JP | 2012079592 A | * | 4/2012 | .............. | H01M 4/64 |

OTHER PUBLICATIONS

Translated JP-20120795972-A (Year: 2012).*

* cited by examiner

*Primary Examiner* — Maria Laios
*Assistant Examiner* — Benjamin T Lustgraaf
(74) *Attorney, Agent, or Firm* — Foley & Lardner LLP

(57) ABSTRACT

Provided herein is an apparatus. The apparatus can include a current collector foil. The current collector foil can include a coated area having an electrode coating. The current collector foil can include an uncoated area having an embossed pattern.

20 Claims, 10 Drawing Sheets

800

PROVIDE CURRENT COLLECTOR FOIL          805

BATTERY CELL AND COMPONENTS THEREOF

INTRODUCTION

Batteries can have different power capacities to charge and discharge power to operate machines.

SUMMARY

Compression forces during manufacturing can deform battery components. For example, a part of a current collector foil can wrinkle when the coated electrode and (un-)exposed current collector foil are being pressed. Wrinkles that form during the pressing process can interfere with manufacturing of the battery. The solutions described herein can prevent the formation of the wrinkles or remove the wrinkles after they have formed by providing the current collector foil with a pattern.

At least one aspect is directed to an apparatus. The apparatus can include a current collector foil. The current collector foil can include a coated area having an electrode coating. The current collector foil can include an uncoated area having an embossed pattern.

At least one aspect is directed to a method. The method can include providing a current collector foil. The method can include coating an area of the current collector foil with an electrode coating. The method can include embossing a non-linear embossed pattern onto an area of the current collector foil without the electrode coating. The method can include applying pressure to the electrode coating.

At least one aspect is directed to a battery. The battery can include a current collector foil. The current collector foil can include a coated area. The coated area can include an electrode coating. The current collector foil can include an uncoated area. The uncoated area can include tabs having an embossed pattern.

At least one aspect is directed to an electric vehicle. The electric vehicle can include a battery including a current collector foil. The current collector foil can include a coated area having an electrode coating. The current collector foil can include a tab having an embossed pattern.

At least one aspect is directed to a method. The method can include providing a current collector foil. The current collector foil can include a coated area. The coated area can include an electrode coating. The current collector foil can include an uncoated area having an embossed pattern.

At least one aspect is directed to a current collector foil. The current collector foil can include a coated area. The coated area can include an electrode coating. The current collector foil can include an uncoated area having an embossed pattern.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of battery electrode manufacturing. The various concepts introduced above and discussed in greater detail below may be implemented in any of numerous ways.

The present disclosure is directed to systems and methods of electrode manufacturing technology for secondary batteries. During electrode manufacturing, a current collector foil that includes electrode-coated areas and uncoated areas can be subject to a pressing process. The electrode-coated areas can experience a compressive force. The compressive force can elongate the current collector foil underneath the electrode coating. By contrast, the uncoated areas of the current collector foil may experience little or no compressive force during the pressing process and therefore may not elongate. The elongation of the coated areas or the difference in elongation between the coated areas and uncoated areas of the current collector foil can produce wrinkles or a wave pattern at or near the boundary between the coated areas and uncoated areas. These wrinkles can interfere with the notching process for producing electrode tabs and can reduce the mechanical strength of the electrode tabs.

At least some technical solutions have a technical advantage of preventing the formation of, or removing, wrinkles. The technical solutions can provide the uncoated areas of the current collector foil with an embossed pattern. The embossed pattern can be applied to the uncoated areas before or after the pressing process. When applied before the pressing process, the embossed pattern can reinforce the uncoated areas to prevent the wrinkles, such that wrinkles do not form in the uncoated areas. The embossed pattern can absorb the wrinkles during the pressing process or stamping process, among other processes. When applied after the pressing process, the embossed pattern can remove the wrinkles that can form in the uncoated areas during the pressing process. By providing the uncoated areas of the current collector foil with an embossed pattern, this technical solution can prevent the formation of or remove undesirable wrinkles for a secondary battery electrode.

Figure 1:
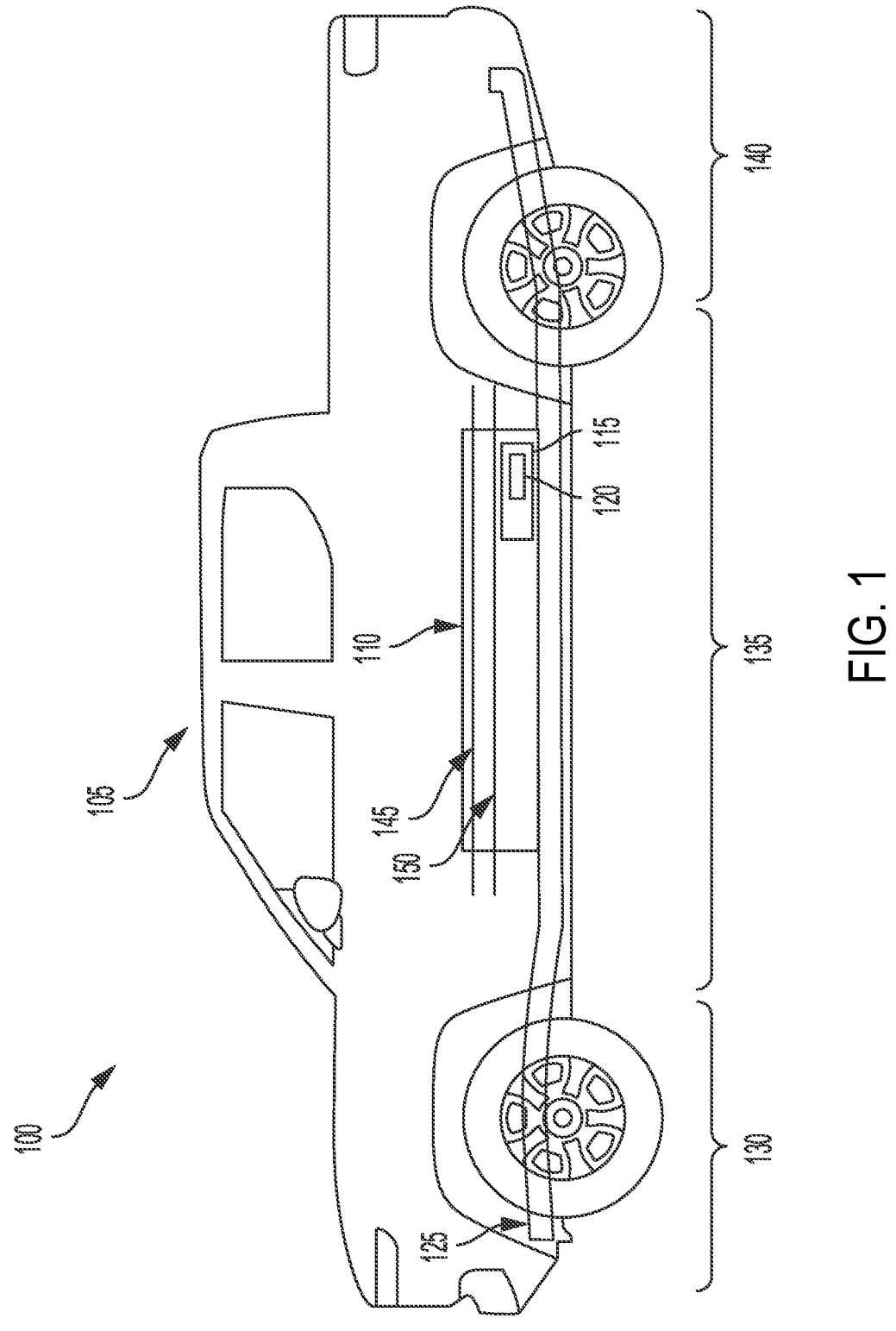
FIG. 1 depicts a cross-sectional view of an electric vehicle, according to an example implementation.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 (e.g., secondary battery) to power the electric vehicles 105. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar (e.g., a current collector element). For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
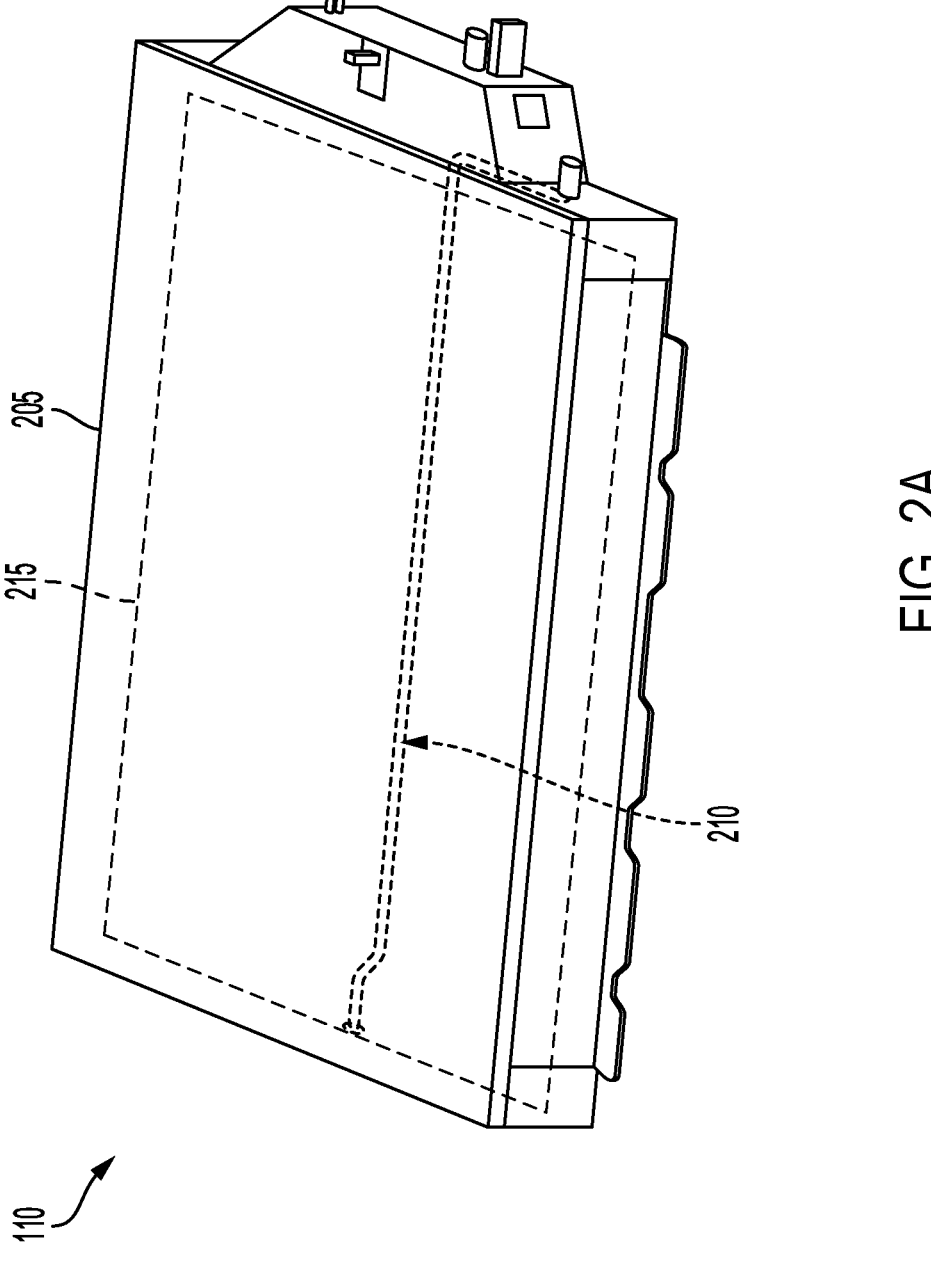
FIG. 2A depicts a battery pack, according to an example implementation.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. In some instances, the cold plate 215 may be positioned in relation to a top submodule and a bottom submodule, such as in between the top and bottom submodules, among other possibilities. As such, the cold plate 215 may be a fraction of the size depicted in FIG. 2A, such that there are multiple cold plates 215 for each top and bottom submodule pair. The cooling line 210 can be coupled with, part of, or independent from the cold plate 215.

Figure 2B:
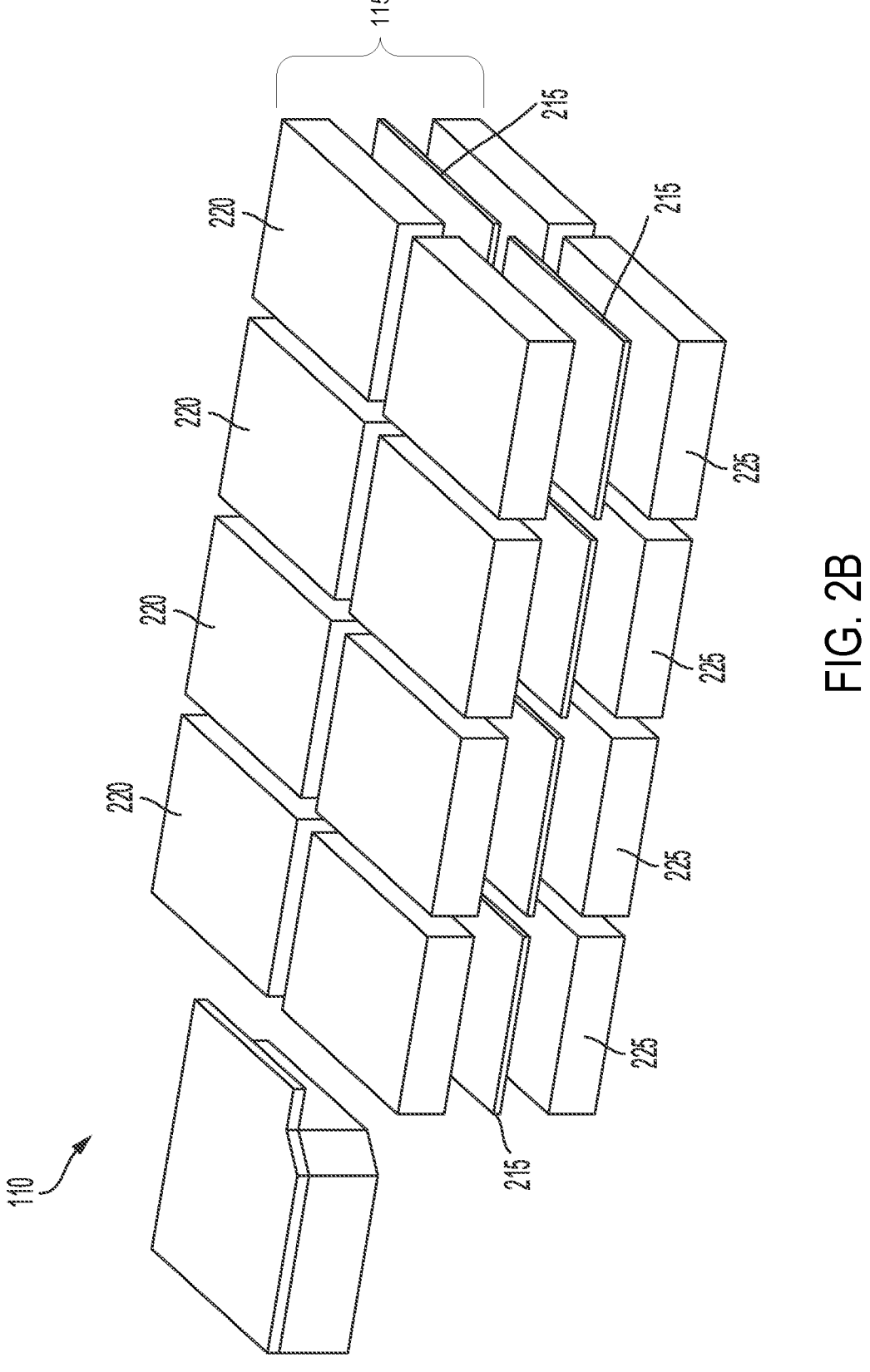
FIG. 2B depicts a battery module, according to an example implementation.
Figure 2C:
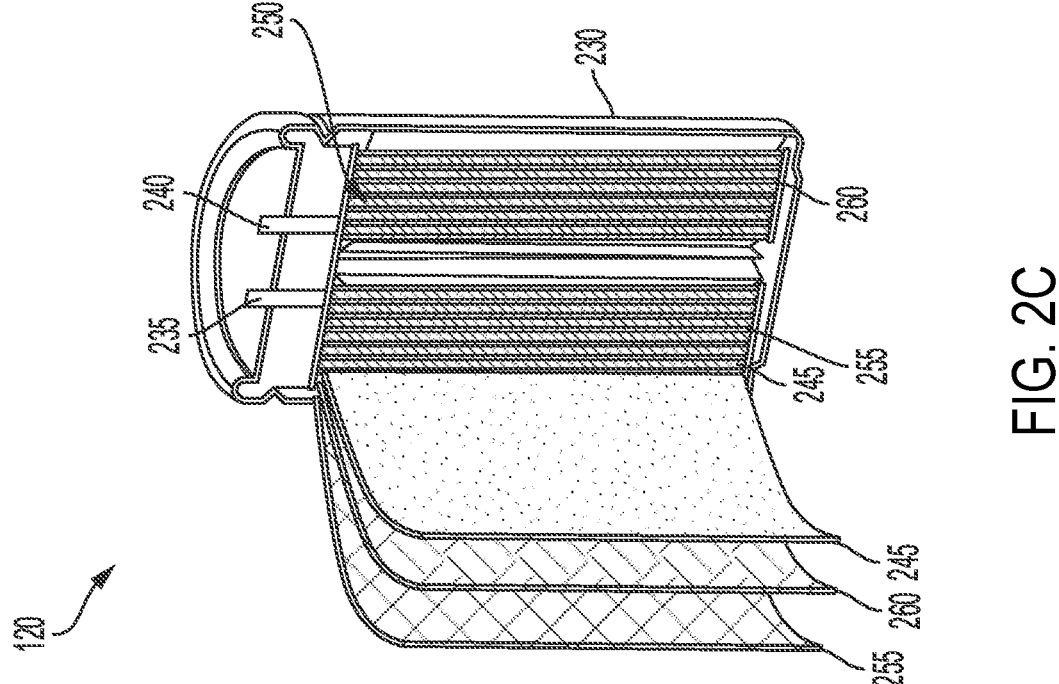
FIG. 2C depicts a cross-sectional view of a battery cell, according to an example implementation.

FIG. 2B depicts example battery modules 115, and FIG. 2C depicts an example cross sectional view of a battery cell 120. The battery modules 115 can include at least one submodule. For example, the battery modules 115 can include at least one first (e.g., top) submodule 220 or at least one second (e.g., bottom) submodule 225. At least one cold plate 215 can be disposed between the top submodule 220 and the bottom submodule 225. For example, one cold plate 215 can be configured for heat exchange with one battery module 115. The cold plate 215 can be disposed or thermally coupled between the top submodule 220 and the bottom submodule 225. One cold plate 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The battery cell 120 can include at least one cathode layer 255 (e.g., a composite cathode layer compound cathode layer, a compound cathode, a composite cathode, or a cathode). The cathode layer 255 can be disposed within the cavity 250. The battery cell 120 can include at least one electrolyte layer 260 disposed within the cavity 250.

Figure 3:
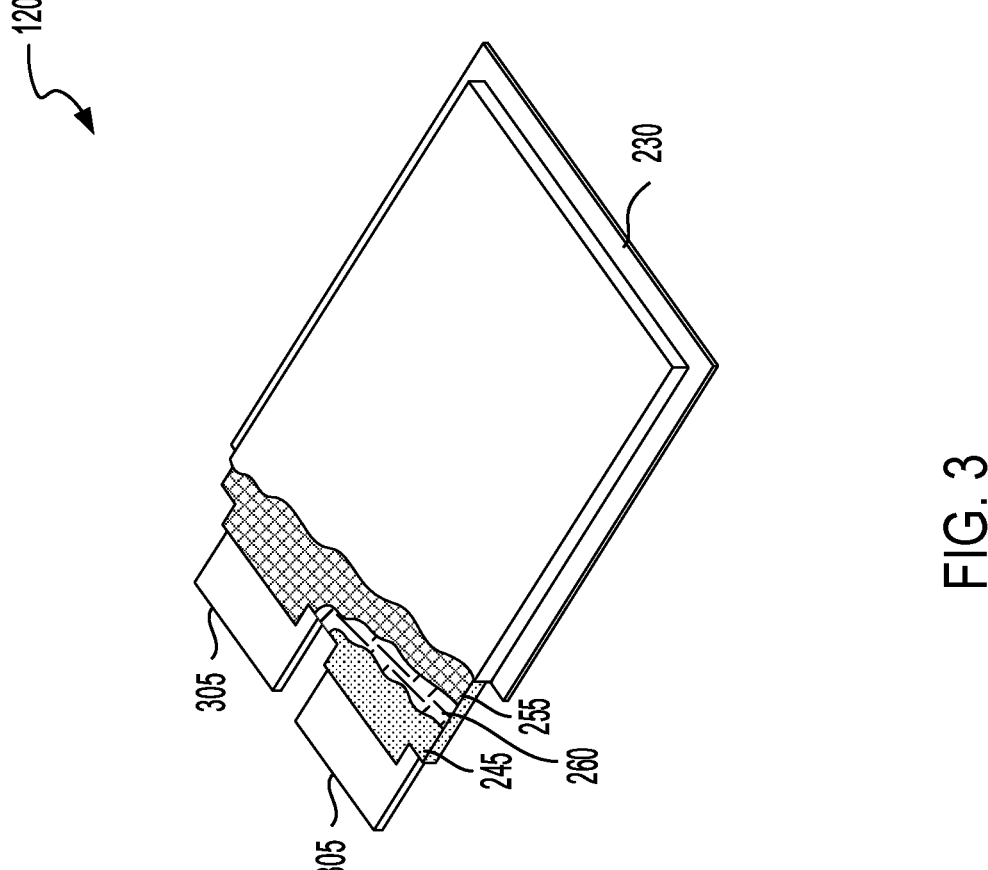
FIG. 3 depicts a cross-sectional view of a battery cell, according to an example implementation.

FIG. 3 depicts a cross-sectional view of the battery cell 120. The battery cell 120 can include a pouch cell (e.g., lithium ion pouch cell). The battery cell 120 can include the housing 230. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal (e.g., a positive or anode terminal) and a second polarity terminal (e.g., a negative or cathode terminal). The polarity terminals can be made from electrically conductive materials to carry electrical current from the battery cell 120 to an electrical load, such as a component or system of the electric vehicle 105.

The battery cell 120 can include at least one anode layer 245. The anode layer 245 can be disposed within the housing 230. The anode layer 245 can receive electrical current into the battery cell 120 and output electrons during the operation of the battery cell 120 (e.g., discharging of the battery cell 120). The anode layer 245 can receive electrons during charging of the battery cell 120. The anode layer 245 can include an active substance (e.g., active material). The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated). The electrode (e.g., anode and cathode electrode) can include an insulation layer on an active material layer. The insulation layer may be blended with polymeric materials with inorganic materials to make increase adhesion and insulation functions. The polymeric materials may include one of the group of polyvinylidene fluoride (PVDF), polytetrafluoroethylene (PTFE), tetrafluoroethylene-perfluoro ethers copolymers, fluorinated ethylene-propylene copolymers, low density polyethylene, polyether, and polyimide and polyamide. The inorganic materials may be composite of aluminum, aluminum alloys, magnesium, magnesium alloys, titanium, and titanium alloys.

The battery cell 120 can include at least one cathode layer 255 (e.g., a composite cathode layer compound cathode layer, a compound cathode, a composite cathode, or a cathode). The cathode layer 255 can be disposed within the housing 230. The cathode layer 255 can output electrical current from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include at least one electrolyte layer 260. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The electrolyte layer 260 can include or be made of a liquid electrolyte material. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride ($Li_xPO_yN_z$), lithium germanium phosphate sulfur ($Li_{10}GeP_2S_{12}$), yttria-stabilized zirconia (YSZ), NASICON ($Na_3Zr_2Si_2PO_{12}$), beta-alumina solid electrolyte (BASE), $ABO_3$ perovskite ceramics (e.g., strontium titanate ($SrTiO_3$)), among others.

The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 260 can include, for example, lithium sulfide-phosphor pentasulfide ($Li_2S$—$P_2S_5$), lithium sulfide-boron sulfide ($Li_2S$—$B_2S_3$), and tin sulfide-phosphor pentasulfide (SnS—$P_2S_5$), among others.

The battery cell 120 can include at least one electrode tab 305 (e.g., tab, battery tab, anode tab, cathode tab, etc.). The electrode tab 305 can be coupled with the anode layer 245 to form an anode tab. Each electrode tab 305 can define at least a portion of a negative terminal for the battery cell 120. The electrode tab 305 can be coupled with the anode layer 245 to receive or draw electrical current into the battery cell 120 and to output electrons during the operation of the battery cell 120 (e.g., discharging of the battery cell 120). The electrode tab 305 can be coupled with the cathode layer 255 to form a cathode tab. Each electrode tab 305 can define at least a portion of a positive terminal for the battery cell 120. The electrode tab 305 can be coupled with the anode layer 245 to output electrical current from the battery cell 120 and to receive electrons during the operation of the battery cell 120 (e.g., discharging of the battery cell 120). The electrode tab 305 can be of any shape, such as a rectangle, square, circle, ellipse, pentagon, or hexagon, among others. The electrode tab 305 can be formed by a notching process. For example, the electrode tab 305 can be cut from a foil (e.g., uncoated foil).

Figure 4:
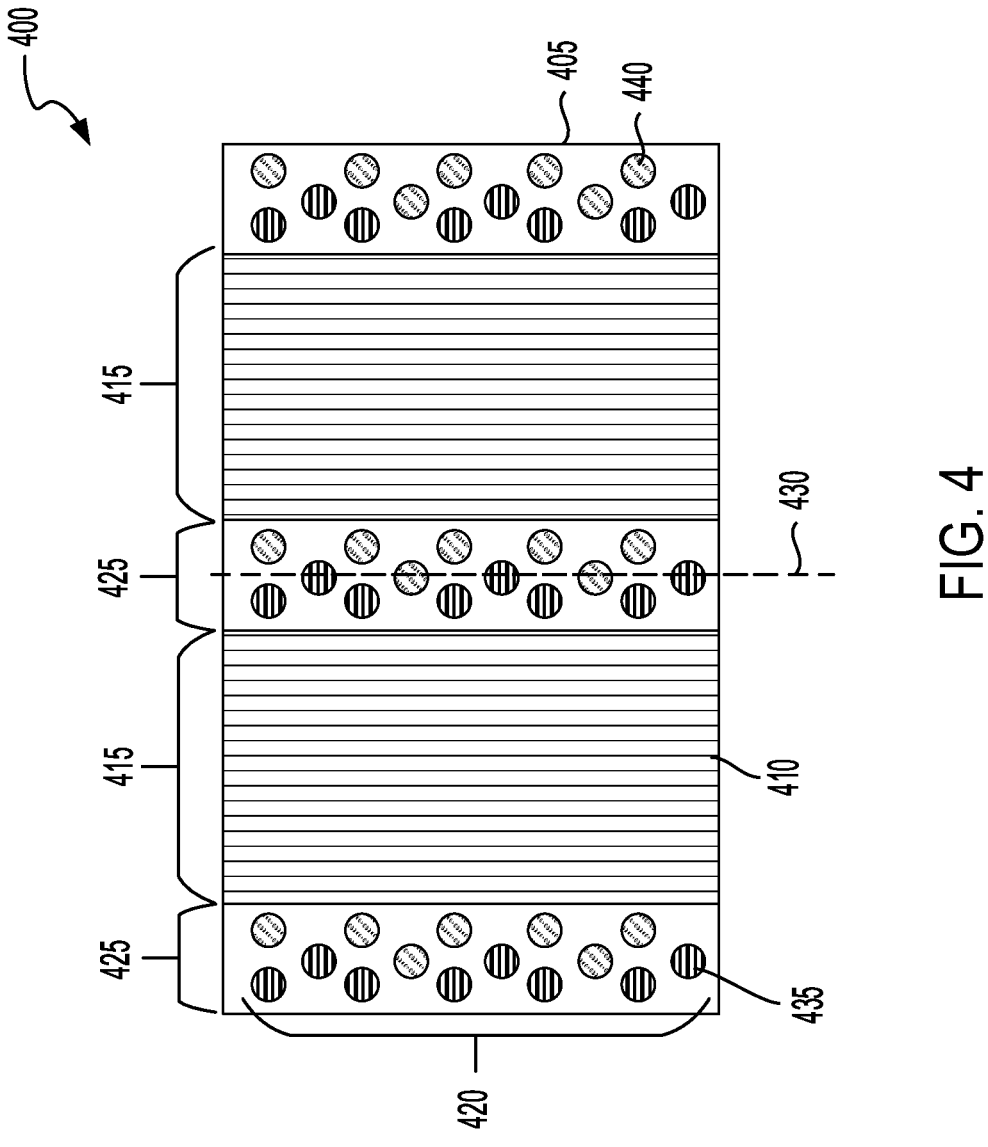
FIG. 4 depicts an overhead view of an apparatus, according to an example implementation.

FIG. 4 depicts an overhead view of an apparatus 400. At least part of the apparatus 400 can form, be a part of, or otherwise be included in the battery cell 120. The apparatus 400 can be for or part of a battery cell of any type, such as a lithium-ion battery cell, a nickel-zinc battery cell, a zinc-bromine battery cell, a zinc-cerium battery cell, a sodium-sulfur battery cell, or a nickel-cadmium battery cell, among others. The apparatus 400 can be of any shape and dimension. For example, the apparatus 400 can be rectangular, square, or polygonal, among others.

The apparatus 400 can include at least one current collector foil 405 (e.g., foil, metal foil, etc.). The current collector foil 405 can include a metal or alloy. For example, the current collector foil 405 can be made of aluminum, copper, stainless steel, molybdenum, nickel, or carbonaceous materials, among others, or any combination thereof. The current collector foil 405 can include a conductive material. The anode layer 245 can include the current collector foil 405. The cathode layer 255 can include the current collector foil 405. The current collector foil 405 can be coated with an electrode, made of an anode or a cathode active material combined with conductive agent and binder material. For example, the current collector foil 405 can be coated with an anode electrode or a cathode electrode. The current collector foil 405 can be coated with the anode layer 245. The current collector foil 405 can be coated with the cathode layer 255.

The current collector foil 405 can include at least one coated area 415 (e.g., electrode-coated area). The coated area 415 can have at least one electrode coating 410. The coated area 415 can include the current collector foil 405 coated with the electrode coating 410. The electrode coating 410 can include an electrode material (e.g., anode material, cathode material). The current collector foil 405 can be coated with the electrode material to form the coated area 415. For example, the current collector foil 405 can be coated with an anode material to form the coated area 415.

The current collector foil 405 can be coated with the anode layer 245. The current collector foil 405 can be coated with a cathode material to form the coated area 415. The current collector foil 405 can be coated with the cathode layer 255. The electrode coating 410 can be disposed on the current collector foil 405 to form the coated area 415. The coated area 415 can include the current collector foil 405 coated with the electrode coating 410. The electrode coating 410 can be disposed on one or more surfaces of the current collector foil 405 to form the coated area 415. The electrode coating 410 can include a slurry (e.g., electrode slurry). The coated area 415 can include a slurry-coated area. The current collector foil 405 can be coated with an electrode slurry to form the coated area 415. The coated area 415 can include the current collector foil 405 coated with the electrode slurry. The current collector foil 405 can be coated with an electrode active material to form the coated area 415. The coated area 415 can include the current collector foil 405 coated with the electrode active material. The coated area 415 can have an even or uneven thickness. The electrode coating 410 can be evenly or unevenly distributed over a portion of the current collector foil 405. The coated area 415 can be formed into the anode layer 245. The coated area 415 can be formed into the cathode layer 255.

The current collector foil 405 can include at least one uncoated area 425. For example the uncoated area 425 can be adjacent to the coated area 415. The uncoated area 425 can be positioned between coated areas 415. The uncoated area 425 can be disposed between coated areas 415. The coated area 415 can be positioned between uncoated areas 425. The coated area 415 can be disposed between uncoated areas 425. The uncoated area 425 can include the current collector foil 405 without the electrode coating 410. The uncoated area 425 can include a portion of the current collector foil 405 that is not covered with the electrode coating 410. The uncoated area 425 can include a portion of the current collector foil 405 that is exposed to air. The uncoated area 425 can be formed into the electrode tab 305. The uncoated area 425 may not experience any compressive force during the pressing process (e.g., stamping process). For example, the uncoated area 425 may not experience any compressive force during the pressing of the electrode coating 410. The uncoated area 425 can experience less compressive force compared to the coated area 415. For example, the uncoated area 425 can experience a first compressive force. The coated area 415 can experience a second compressive force. The first compressive force can be less than the second compressive force. The second compressive force can be greater than the first compressive force.

The uncoated area 425 can have at least one pattern 420. For example, the pattern 420 can include an embossed pattern, a debossed pattern, or combinations thereof. The pattern 420 can be linear or non-linear, and can include a random, symmetrical, ordered, or asymmetrical pattern. For example, the non-linear pattern can include a pattern that is not arranged along a straight line. The pattern 420 can include a linear or non-linear debossed pattern. The pattern 420 can include holes or cutouts. The pattern 420 can include protrusions or depressions. The uncoated area 425 can have at least one pattern 420 (e.g., a non-linear embossed pattern, or an embossed pattern. For example, the pattern 420 can be non-linear along an axis parallel to a boundary of the coated area 415. The pattern 420 can include a random pattern or a periodic pattern. For example, the pattern 420 can include a non-linear periodic arrangement. The pattern 420 can include a pattern that includes three dimensional features, disposed for example on the current collector foil 405. The pattern 420 can include a pattern arrayed in two dimensions, for example, on the current collector foil 405. The pattern 420 can be formed from an embossing roller or embossing die. The pattern 420 can be symmetric or asymmetric along the axis parallel to the boundary of the coated area 415. The current collector foil 405 can include at least one uncoated area 425 having the pattern 420. The pattern 420 can be non-linear along a longitudinal axis. The pattern 420 can be produced during the pressing of the coated area 415. The pattern 420 can be produced during the manufacturing process of the battery cell 120. The pattern 420 can include a predetermined pattern, such as a series of semi-spheres, half-spheres, or zig-zag lines. The pattern 420 can be different from an artifact produced during the pressing of the coated area 415. The pattern 420 can be different from an artifact produced during the manufacturing process of the battery cell 120. For example, the pattern 420 can be different from wrinkles produced during the pressing of the coated area 415. The pattern 420 can be different from wrinkles produced during the manufacturing process of the battery cell 120. The pattern 420 can exclude wrinkles. The pattern 420 can include at least one raised feature. The pattern 420 can include at least one depressed feature. The embossed pattern can be linear, non-linear, symmetrical, or asymmetrical, for example. The embossed pattern can include protrusions, depressions or combinations thereof.

At least a portion of the pattern 420 can be disposed on the uncoated area 425. For example, all or some of the pattern 420 can be disposed on the uncoated area 425. At least a portion of the pattern 420 can be disposed on the uncoated area 425 to cover at least a portion of a wrinkle (e.g., wrinkle 605) of the uncoated area 425. At least a portion of the pattern 420 can be disposed on a surface of the uncoated area 425. At least a portion of the pattern 420 can be disposed on the coated area 415. For example, the pattern 420 can span the uncoated area 425 and at least part of the coated area 415. At least a portion of the pattern 420 can cover the uncoated area 425 and the coated area 415. The pattern 420 can reach the coated area 415. The pattern 420 can partially extend to the coated area 415. The pattern 420 can reinforce the uncoated area 425 to prevent the wrinkles, such that wrinkles do not form in the uncoated area 425.

The pattern 420 can include a combination of protrusions 435 and depressions 440. For example, the embossed pattern can include a combination of protrusions 435 and depressions 440. The pattern 420 can include at least one protrusion 435. The pattern 420 can include at least one depression 440. The pattern 420 can include only protrusions 435. The pattern 420 can include only depressions 440. The pattern 420 can include a debossed pattern. The pattern 420 can include at least one hole or at least one cutout. The pattern 420 can include protrusions 435 and depressions 440 in the uncoated area 425. The protrusions 435 can be convex. The protrusions 435 can include hills, mounds, bumps, impressions, or levels. The protrusions 435 can include cuts or scratches. The protrusions 435 can be symmetric or asymmetric along the axis parallel to the boundary of the coated area 415. The depressions 440 can be concave. The depressions 440 can include valleys, insets, impressions, or levels. The depressions 440 can include cuts, scores, marks, divots, dents, or scratches. The depressions 440 can be symmetric or asymmetric along the axis parallel to the boundary of the coated area 415. The protrusions 435 and depressions 440 can be symmetric or asymmetric along the axis parallel to the boundary of the coated area 415. The size of the pattern can depend on the density or on the material of the current collector foil 405.

The protrusions 435 or the depressions 440 can be of any shape such as a rectangle, square, circle, trapezoid, ellipse, pentagon, hexagon, or other features, among others. The protrusions 435 or the depressions 440 can have rounded or sharp edges, and can have the same shape or different shapes. The protrusions 435, for example, can have the same shapes or different shapes as the depressions 440. The protrusions 435 or the depressions 440 can have a depth in a range of 1 µm to 1500 µm (e.g., 1 µm, 5 µm, 10 µm, 25 µm, 50 µm, 100 µm, 150 µm, 200 µm, 250 µm, 300 µm, 400 µm, 500 µm, 600 µm, 700 µm, 800 µm, 900 µm, 1000 µm, or 1500 µm, inclusive). The protrusions 435 or the depressions 440 can have a depth of less than 1 µm. The protrusions 435 or the depressions 440 can have a depth of greater than 1500 µm. The protrusions 435 or the depressions 440 can have the same depth or different depths. The protrusions 435 or the depressions 440 can have a height in a range of 1 µm to 1500 µm (e.g., 1 µm, 5 µm, 10 µm, 25 µm, 50 µm, 100 µm, 150 µm, 200 µm, 250 µm, 300 µm, 400 µm, 500 µm, 600 µm, 700 µm, 800 µm, 900 µm, 1000 µm, or 1500 µm, inclusive). The protrusions 435 or the depressions 440 can have a height of less than 1 µm. The protrusions 435 or the depressions 440 can have a height of greater than 1500 µm. The protrusions 435 or the depressions 440 can have the same height or different heights. The protrusions 435 or the depressions 440 can have a width in a range of 0.1 mm to 10 mm (e.g., 0.1 mm, 0.25 mm, 0.5 mm, 0.75 mm, 1 mm, 2 mm, 3 mm, 4 mm, 5 mm, 6 mm, 7 mm, 8 mm, 9 mm, or 10 mm, inclusive). The protrusions 435 or the depressions 440 can have a width of less than 0.1 mm. The protrusions 435 or the depressions 440 can have a width of greater than 10 mm. The protrusions 435 or the depressions 440 can have the same width or different widths. The protrusions 435 or the depressions 440 can have a length in a range of 0.1 mm to 10 mm (e.g., 0.1 mm, 0.25 mm, 0.5 mm, 0.75 mm, 1 mm, 2 mm, 3 mm, 4 mm, 5 mm, 6 mm, 7 mm, 8 mm, 9 mm, or 10 mm, inclusive). The protrusions 435 or the depressions 440 can have a length of less than 0.1 mm. The protrusions 435 or the depressions 440 can have a length of greater than 10 mm. The protrusions 435 or the depressions 440 can have the same length or different lengths. The protrusions 435 or the depressions 440 can be continuous or non-continuous. The pattern 420 can include 10% protrusions 435, 20% protrusions 435, 30% protrusions 435, 40% protrusions 435, 50% protrusions 435, 60% protrusions 435, 70% protrusions 435, 80% protrusions 435, 90% protrusions 435, or 100% protrusions 435. The pattern 420 can include 10% depressions 440, 20% depressions 440, 30% depressions 440, 40% depressions 440, 50% depressions 440, 60% depressions 440, 70% depressions 440, 80% depressions 440, 90% depressions 440, or 100% depressions 440. The heights and depths of a single pattern 420 can be the same (e.g., matching) or different. For example, the heights can be higher than the depths are deep. The depths can be deeper than the heights are high.

The pattern 420 can be read (e.g., detected) by an optical element (e.g., camera, vision system, scanner, etc.). For example, the protrusions 435 or depressions 440 can be detected by the optical element. The optical element can use the pattern 420 to locate the edge of the coated area 415 or the edge of the uncoated area 425. The optical element can use the pattern 420 to locate the boundary between the coated area 415 and the uncoated area 425. The optical element can use the pattern 420 to identify one or more areas to cut one or more electrode tabs 305 from the uncoated area 425. The optical element can use the pattern 420 for orientation purposes during the electrode manufacturing process. The optical element can use the pattern 420 to calibrate its location. For example, the shape and size of the pattern 420 can be used by the optical element to determine its location.

The pattern 420 can increase a strength of at least a portion of the current collector foil 405. The pattern 420 can increase a mechanical strength of at least a portion of the current collector foil 405. For example, the mechanical strength can include compressive strength, impact strength, or tensile strength. Relative to the current collector foil that does not have the embossed pattern, the embossed pattern can increase the mechanical strength of the current collector foil 405. For example, the mechanical strength can increase by 5% to 30% (e.g., 5%, 10%, 15%, 20%, 25%, or 30%, inclusive). The mechanical strength can increase by less than 5%. The mechanical strength can increase by more than 30%. The mechanical strength of the current collector foil 405 with the pattern 420 can be greater than the mechanical strength of the current collector foil 405 without the pattern 420. The mechanical strength of the current collector foil 405 without the pattern 420 can be less than the mechanical strength of the current collector foil 405 with the pattern 420.

For example, the current collector foil 405 with the pattern 420 can have a first mechanical strength, and the current collector foil 405 without the pattern 420 can have a second mechanical strength. The first mechanical strength can be greater than the second mechanical strength. The current collector foil 405 with the pattern 420 can withstand an applied load without forming wrinkles in the uncoated area 425. The pattern 420 can increase the mechanical strength of at least a portion of the current collector foil 405 such that pressure applied to the coated area 415 does not lead to the formation of wrinkles in the uncoated area 425. The pattern 420 can increase a strength of at least a portion of the current collector foil 405. The pattern 420 can strengthen at least a portion of the current collector foil 405. For example, the pattern 420 can strengthen at least a portion of the current collector foil 405 against elongation.

The pattern 420 can be disposed on the current collector foil, for example between a first coated area 415 and a second coated area 415. At least a portion of the pattern 420 can be disposed between the first coated area 415 and the second coated area 415. The pattern 420 can be disposed, situated, or arranged adjacent to or between the first coated area 415 or to the second coated area 415. The pattern 420 can be positioned on the current collector foil 405 between the first coated area 415 and the second coated area 415. The pattern 420 can be located on the current collector foil 405, for example between the first coated area 415 and the second coated area 415.

The pattern 420 can be disposed along an axis 430 (e.g., longitudinal axis) parallel to the boundary of the coated area 415. The pattern 420 can be disposed along the axis 430 parallel to the boundary of the uncoated area 425. The boundary of the coated area 415 or the boundary of the uncoated area 425 can delineate the coated area 415 from the uncoated area 425. The axis 430 can be positioned between the first coated area 415 and the second coated area 415. The axis 430 can be positioned along the uncoated area 425. The protrusions 435 can be symmetric or asymmetric along the axis parallel to the boundary of the coated area 415 or the boundary of the coated area 415. The depressions 440 can be symmetric or asymmetric along the axis parallel to the boundary of the coated area 415 or the boundary of the coated area 415. The non-linear pattern can include a pattern that is not arranged along the axis 430 parallel to the boundary of the coated area.

The apparatus 400 can be part of a battery (e.g., battery cell 120). The battery can include the current collector foil 405. The current collector foil 405 can include one or more coated areas 415. The coated area 415 can include the electrode coating 410. The current collector foil 405 can include one or more uncoated areas 425. The uncoated area 425 can include at least one tab (e.g., electrode tab 305, battery tab, anode tab, cathode tab). The electrode tab 305 can include the pattern 420. The pattern 420 can increase the mechanical strength of at least a portion of the current collector foil 405, for example be forming or changing the shape or contour of portions of the current collector foil 405. For example, the pattern 420 can include a combination of protrusions 435 or depressions 440. The pattern 420 can include protrusions 435 in the uncoated area 425. The pattern 420 can include depressions 440 in the uncoated area 425. The pattern 420 can include only protrusions 435, or only depressions 440. The pattern 420 can include a debossed pattern. At least a portion of the pattern 420 can be disposed on the uncoated area 425. For example, at least a portion of the pattern 420 can be disposed on the uncoated area 425 to cover at least a portion of a wrinkle (e.g., wrinkle 605) of the uncoated area 425. At least a portion of the pattern 420 can be disposed on the uncoated area 425 near the coated area 415.

Figure 5:
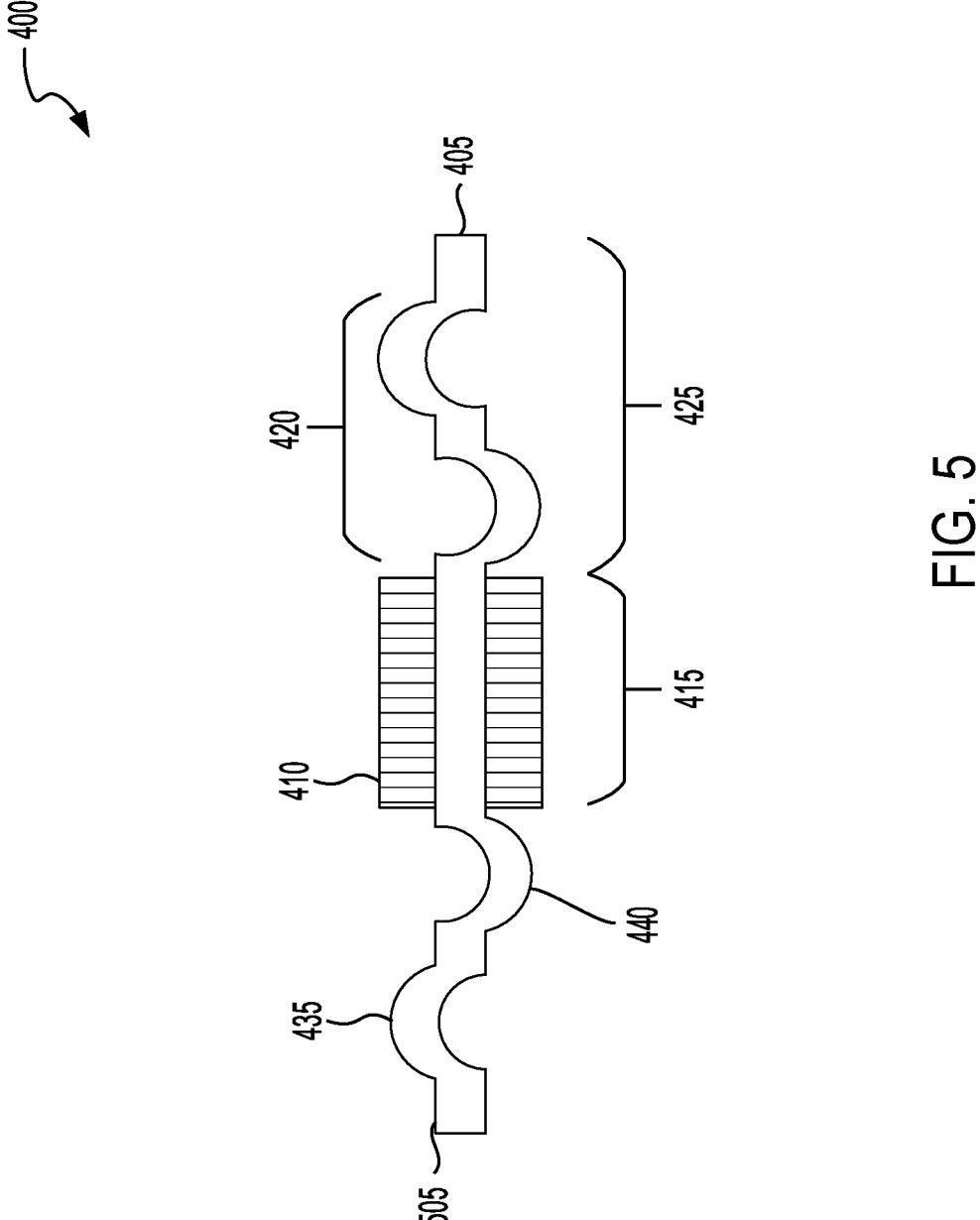
FIG. 5 depicts a cross-sectional view of an apparatus, according to an example implementation.

FIG. 5 depicts a cross-sectional view of the apparatus 400. The apparatus 400 can include the current collector foil 405. The apparatus 400 can include the electrode coating 410. The apparatus 400 can include the coated area 415. The apparatus 400 can include uncoated area 425. The uncoated area 425 can include the pattern 420. The pattern 420 can include protrusions 435. The pattern 420 can include depressions 440. The current collector foil 405 can include a first surface 505. The coated area 415 can cover a first portion of the first surface 505. The uncoated area 425 can include a second portion of the first surface 505. The first portion of the first surface 505 can be adjacent to the second portion of the first surface 505. The first portion of the first surface 505 can include the pattern 420. For example, the protrusions 435 can be located in the first portion of the first surface 505. The depressions 440 can be located in the first portion of the first surface 505. The second portion of the first surface 505 can include the pattern 420. For example, the protrusions 435 can be located in the second portion of the first surface 505. The depressions 440 can be located in the second portion of the first surface 505. The electrode coating 410 can be disposed on a second surface of the current collector foil 405. The second surface of the current collector foil 405 can be opposite the first surface 505. The protrusions 435 can be located in the second surface. The depressions 440 can be located in the second surface.

Figure 6:
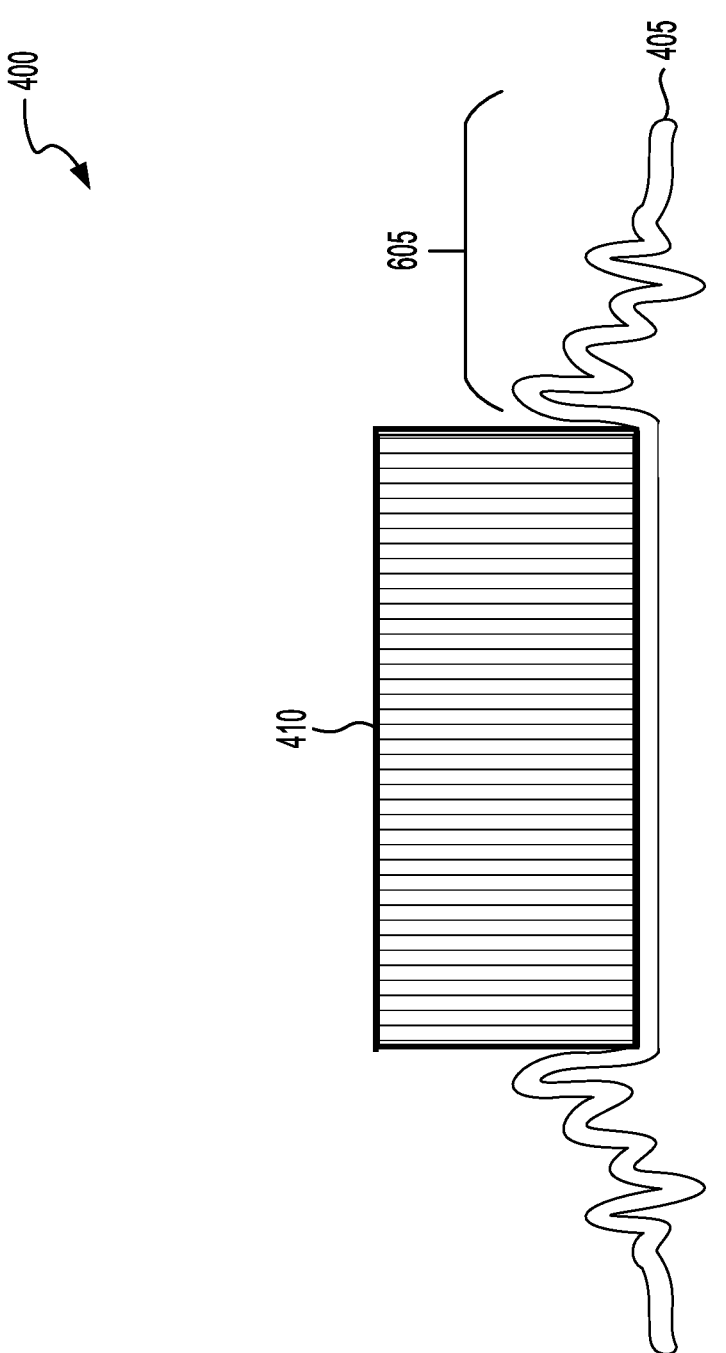
FIG. 6 depicts a cross-sectional view of an apparatus, according to an example implementation.

FIG. 6 depicts a cross-sectional view of the apparatus 400. The apparatus 400 can include the electrode coating 410. The apparatus 400 can include the current collector foil 405. The current collector foil 405 can include at least one wrinkle 605. The wrinkle 605 can be part of the current collector foil 405. The current collector foil 405 can be wrinkled due to a pressing force on the electrode coating 410. The current collector foil 405 can wrinkle during pressing of the electrode coating 410. The current collector foil 405 can wrinkle near the electrode coating 410 due to the pressing of the electrode coating 410. The coated area 415 can experience a higher force (e.g., compressive force, press force, pressing force, shear force, etc.) than the uncoated area 425. The wrinkle 605 can form because the coated area 415 can experiences a higher force than the uncoated area 425.

The uncoated area 425 may experience de minimis or no compressive force while the electrode coating 410 is pressed (e.g., pressing of the electrode coating 410 during a stamping, rolling or other manufacturing process). The difference in elongation between the coated area 415 and uncoated area 425 of the current collector foil 405 can produce wrinkles 605 (e.g., wave pattern, or series of oscillations, curves, or undulations) at the boundary between the coated area 415 and uncoated area 425. The difference in elongation between the coated area 415 and uncoated area 425 of the current collector foil 405 can produce wrinkles 605 near the boundary between the coated area 415 and uncoated area 425. The wrinkle 605 can form at the edge of the uncoated area 425. The wrinkles 605 can interfere with the notching process for producing electrode tabs 305. The wrinkles 605 can reduce the mechanical strength of the electrode tabs 305. The elongation of the coated area 415 can produce wrinkles 605 at the boundary between the coated area 415 and uncoated area 425. The elongation of the coated area 415 can produce wrinkles 605 near the boundary between the coated area 415 and uncoated area 425. The uncoated area 425 may not experience any compressive force during the pressing process (e.g., stamping process). For example, the uncoated area 425 may not experience any compressive force during the pressing of the electrode coating 410. The uncoated area 425 can experience less compressive force compared to the coated area 415. For example, the uncoated area 425 can experience a first compressive force. The coated area 415 can experience a second compressive force. The first compressive force can be less than the second compressive force. The second compressive force can be greater than the first compressive force.

Figure 7:
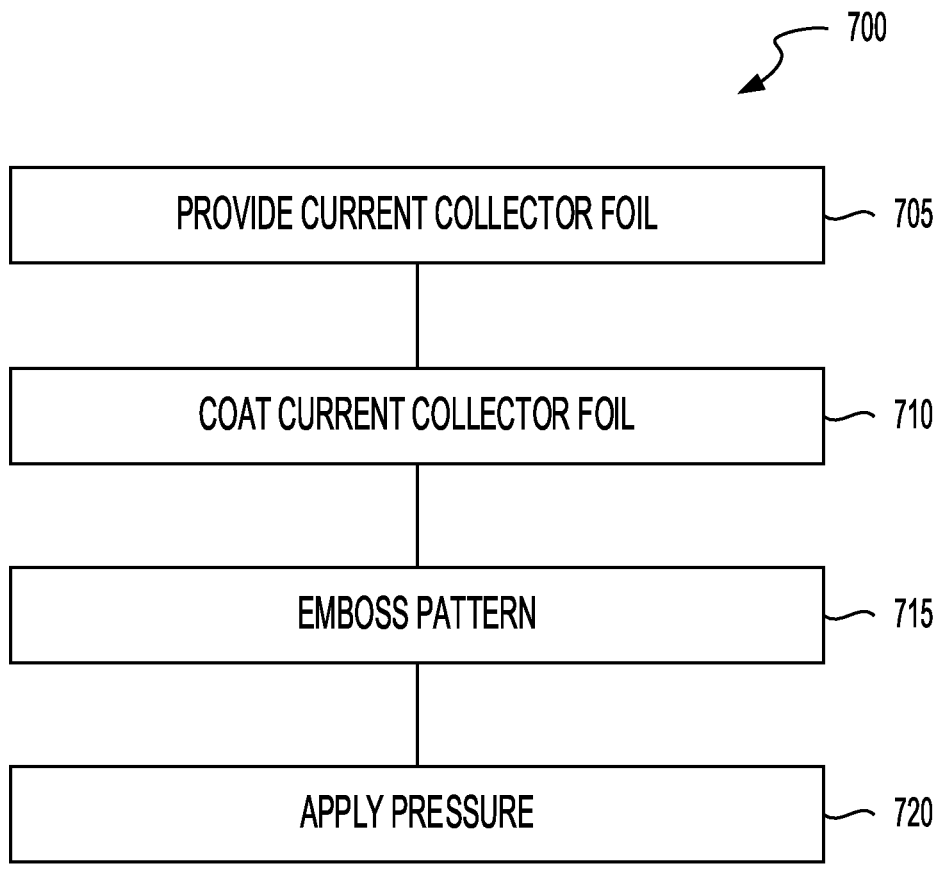
FIG. 7 depicts a method of forming an apparatus, according to an example implementation.

FIG. 7 depicts a method 700 of forming an apparatus. The method 700 can include providing a current collector foil (ACT 705). The method 700 can include coating the current collector foil (ACT 710). The method 700 can include embossing a pattern (ACT 715). The method 700 can include applying pressure (ACT 720). The acts of the method 700 may be interchangeable or removed. Additional acts may be added to the method 700.

The method 700 can include providing a current collector foil (ACT 705). The current collector foil can include a metal or alloy. For example, the current collector foil can be made of aluminum, copper, stainless steel, molybdenum, nickel, among others, or any combination thereof. The current collector foil can include a conductive material. The anode layer can include the current collector foil. The cathode layer can include the current collector foil. The current collector foil can be coated with an electrode material. For example, the current collector foil can be coated with an anode material. The current collector foil can be coated with the anode layer. The current collector foil can be coated with a cathode material. The current collector foil can be coated with the cathode layer.

The method 700 can include coating the current collector foil (ACT 710). For example, the method 700 can include coating an area of the current collector foil with an electrode coating. The current collector foil can include the coated area. The current collector foil can be coated with an electrode slurry. The current collector foil can be coated with the electrode coating before performing a roll press process. The current collector foil can be coated with the electrode coating before performing a calendaring process. The roll press process can include compressing the current collector foil with the electrode coating through rollers.

The method 700 can include embossing at least one pattern (ACT 715). For example, the method 700 can include embossing a non-linear embossed pattern onto an area of the current collector foil without the electrode coating. The pattern can be an embossed pattern. The pattern can be non-linear. For example, the pattern can be non-linear along an axis parallel to a boundary of the coated area. The non-linear pattern can include a random pattern. The non-linear pattern can include a pattern that is not arranged along a straight line. The pattern can include a random pattern. The pattern can be arranged in a random arrangement. The pattern can include a periodic pattern. The pattern can be arranged in a periodic arrangement. For example, the pattern can include a non-linear periodic arrangement. The pattern can include a pattern that is not arranged along a straight line. The pattern can include a pattern that includes two dimensional features. The pattern can include a pattern that includes two dimensional features disposed on the current collector foil. The pattern can include a pattern arrayed in two dimensions. The pattern can include a pattern arrayed in two dimensions on the current collector foil. The pattern can be formed from an embossing roller or embossing die. The pattern can be symmetric or asymmetric along the axis parallel to the boundary of the coated area. The current collector foil can include at least one uncoated area having the pattern. The pattern can be non-linear along a longitudinal axis. The pattern can be produced during the pressing of the coated area. The pattern can be produced during the manufacturing process of the battery cell. The pattern can include a predetermined pattern. The pattern can be different from an artifact produced during the pressing of the coated area. The pattern can be different from an artifact produced during the manufacturing process of the battery cell. For example, the pattern can be different from wrinkles produced during the pressing of the coated area. The pattern can be different from wrinkles produced during the manufacturing process of the battery cell. The pattern can exclude wrinkles.

The pattern can include protrusions and depressions in the area of the current collector foil without the electrode coating (e.g., uncoated area). The embossed pattern can include at least one protrusion. The embossed pattern can include at least one depression. The embossed pattern can include a combination of protrusions and depressions. The embossed pattern can include only protrusions. The embossed pattern can include only depressions. The embossed pattern can include a debossed pattern. The embossed pattern can include protrusions and depressions. For example, the embossed pattern can include protrusions and depressions in the uncoated area. The protrusions can be convex. The protrusions can include hills. The protrusions can include cuts or scratches. The protrusions can be symmetric or asymmetric along the axis parallel to the boundary of the coated area. The pattern can include protrusions and depressions in the uncoated area. The depressions can be concave. The depressions can include valleys. The depressions can include cuts or scratches. The depressions can be symmetric or asymmetric along the axis parallel to the boundary of the coated area. The protrusions and depressions can be symmetric or asymmetric along the axis parallel to the boundary of the coated area. The non-linear pattern can include a pattern that is not arranged along the axis parallel to the boundary of the coated area.

The method 700 can include applying pressure (ACT 720). For example, the method 700 can include applying pressure to the electrode coating. The pressure can be applied to the electrode coating before the pattern is embossed onto the current collector foil. The pressure can be applied to the electrode coating before the pattern is embossed onto the current collector foil. The pressure can be applied to the electrode coating before the pattern is embossed onto an area of the current collector foil. The pattern can eliminate any or all wrinkles in the current collector foil. The pattern can remove any or all wrinkles in the current collector foil. Applying pressure can include pressing or stamping. Pressure can be applied to the area of the current collector foil without the electrode coating. Pressure can be applied to the area of the current collector foil by a calender press or between calender rolls.

The pressure can be applied to the electrode coating after the pattern is embossed onto the current collector foil. The pressure can be applied to the electrode coating after the pattern is embossed onto the current collector foil. The pressure can be applied to the electrode coating after the pattern is embossed onto an area of the current collector foil. The pattern can increase the mechanical strength of at least a portion of the current collector foil. The pattern can increase the mechanical strength of at least a portion of the current collector foil. The pattern can prevent the formation of wrinkles. The mechanical strength can include compressive strength, impact strength, or tensile strength. Relative to the current collector foil that does not have the embossed pattern, the embossed pattern can increase the mechanical strength of the current collector foil. For example, the mechanical strength can increase by 5% to 30% (e.g., 5%, 10%, 15%, 20%, 25%, or 30%, inclusive). The mechanical strength can increase by less than 5%. The mechanical strength can increase by more than 30%.

The method 700 can include forming at least one electrode tab. For example, the method 700 can include forming the electrode tab from the current collector foil without the electrode coating. The electrode tab can be coupled with the anode layer to form an anode tab. Each electrode tab can define at least a portion of a negative terminal for the battery cell. The electrode tab can be coupled with the anode layer to receive or draw electrical current into the battery cell and to output electrons during the operation of the battery cell (e.g., discharging of the battery cell). The electrode tab can be coupled with the cathode layer to form a cathode tab. Each electrode tab can define at least a portion of a positive terminal for the battery cell. The electrode tab can be coupled with the anode layer to output electrical current from the battery cell and to receive electrons during the operation of the battery cell (e.g., discharging of the battery cell). The electrode tab can be of any shape, such as a rectangle, square, circle, ellipse, pentagon, or hexagon, among others. The electrode tab can be formed by the notching process. For example, the electrode tab can be cut from a foil (e.g., uncoated foil). The electrode tab can be formed from the current collector foil. The pattern can be helpful for vision reading. For example, an optical element (e.g., camera, vision system, scanner, etc.) can be used to read the pattern. The optical element can detect the pattern. The optical element can detect the pattern during the notching process. The shape and size of the pattern can depend on the vision system. For example, the shape and size of the pattern can depend on the angle of light. The shape and size of the pattern can depend on the light source. The optical element can be calibrated using the pattern.

The method 700 can include forming at least one electrode. For example, the method 700 can include forming the electrode from the electrode tab and the current collector foil with the electrode coating. The electrode can be for a secondary battery. The electrode can be disposed in the secondary battery. Forming the electrode can include combining the electrode tab and the current collector foil with the battery cell housing. Forming the electrode can include combining the electrode tab and the current collector foil with the electrolyte layer.

The method 700 can include disposing at least a portion of the pattern (e.g., non-linear embossed pattern) onto the area of the current collector foil without the electrode coating. For example, the method 700 can include disposing at least a portion of the pattern onto the area of the current collector foil without the electrode coating to cover at least a portion of a wrinkle of the current collector foil. At least a portion of the embossed pattern can be disposed on the uncoated area to cover at least a portion of the wrinkle of the uncoated area. At least a portion of the pattern can be disposed on a surface of the uncoated area. For example, at least a portion of the pattern can be disposed on the uncoated area near the coated area. At least a portion of the pattern can be disposed on the coated area. For example, the pattern can span the uncoated area and the coated area. At least a portion of the embossed pattern can cover the uncoated area and the coated area. The pattern can reach the coated area. The pattern can partially extend to the coated area.

The method 700 can include increasing a mechanical strength of at least a portion of the current collector foil. For example, the embossed pattern can increase a mechanical strength of at least a portion of the current collector foil. The mechanical strength can include compressive strength. The mechanical strength can include impact strength. The mechanical strength can include tensile strength. Relative to a current collector foil that does not have the embossed pattern, the embossed pattern can increase the mechanical strength of the current collector foil. For example, the mechanical strength can increase by 5% to 30% (e.g., 5%, 10%, 15%, 20%, 25%, or 30%, inclusive). The mechanical strength can increase by less than 5%. The mechanical strength can increase by more than 30%. The mechanical strength of the current collector foil with the embossed pattern can be greater than the mechanical strength of the current collector foil without the embossed pattern. The mechanical strength of the current collector foil without the embossed pattern can be less than the mechanical strength of the current collector foil with the embossed pattern.

In some embodiments, the area can include a first area. The method 700 can include coating a second area of the current collector foil with the electrode coating. The method 700 can include disposing the pattern between the first area and the second area. The pattern can be disposed between the first area and the second area. The pattern can be disposed on the first area. The pattern can be disposed on the second area. The first area can include the first coated area. The second area can include the second coated area. The first area and the second area can have the same size. The first area and the second area can have different sizes.

The method 700 can include disposing the pattern along an axis parallel to a boundary of the area of the current collector foil with the electrode coating. The pattern (e.g., non-linear embossed pattern) can be disposed along the axis parallel to the boundary of the coated area. The axis can be positioned between the first coated area and the second coated area. The axis can be positioned along the uncoated area. The pattern can include the protrusions. The protrusions can be symmetric or asymmetric along the axis parallel to the boundary of the coated area. The pattern can include the depressions. The depressions can be symmetric or asymmetric along the axis parallel to the boundary of the coated area. The pattern can include the features. The features can be symmetric or asymmetric along the axis parallel to the boundary of the coated area. The non-linear pattern can include a pattern that is not arranged along the axis parallel to the boundary of the coated area.

Figure 8:
FIG. 8 depicts a method of providing a current collector foil, according to an example implementation.

FIG. 8 depicts a method 800 of providing a current collector foil. The method 800 can include providing the current collector foil (ACT 805). For example, the method 800 can include providing the apparatus 400 including the current collector foil. The current collector foil can include a coated area. The coated area can have an electrode coating. The current collector foil can include an uncoated area. The uncoated area can have a pattern. The uncoated area can have an embossed pattern. The uncoated area can include tabs. The uncoated area can include tabs having the embossed pattern.

While operations are depicted in the drawings in a particular order, such operations are not required to be performed in the particular order shown or in sequential order, and all illustrated operations are not required to be performed. Actions described herein can be performed in a different order. The steps of a method may be interchangeable in the process. The steps of the method may be removed from the process. Other steps may be added to the method.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
   a current collector foil, comprising:
      a coated area having an electrode coating; and
      an uncoated area having an embossed pattern including
         a first row of first features comprising protrusions disposed along a first axis parallel to a boundary between the coated area and the uncoated area, a second row of second features comprising depressions disposed along a second axis parallel to the boundary between the coated area and the uncoated area, and a third row of features comprising alternating protrusions and depressions (1) disposed between the first row and the second row and (2) aligned along a third axis parallel to the boundary between the coated area and the uncoated area, each of the protrusions and the depressions positioned in the uncoated area having a depth in a range of 1 μm to 1500 μm and a width in a range of 0.1 mm to 10 mm.

2. The apparatus of claim 1, comprising:

at least a portion of the embossed pattern includes a non-linear pattern disposed on the uncoated area to cover at least a portion of a wrinkle of the uncoated area.

3. The apparatus of claim 1, wherein the embossed pattern increases a mechanical strength of at least a portion of the current collector foil.

4. The apparatus of claim 1, wherein the coated area is a first coated area, comprising:

the embossed pattern includes a non-linear pattern disposed between the first coated area and a second coated area.

5. The apparatus of claim 1, comprising:

the embossed pattern disposed along an axis parallel to a boundary of the coated area.

6. The apparatus of claim 1, wherein the current collector foil includes a first surface, comprising:

the coated area covering a first portion of the first surface, and the uncoated area including a second portion of the first surface.

7. The apparatus of claim 1, further comprising:

an electrode comprising an insulation layer on an active material layer.

8. A method, comprising:

providing a current collector foil;

coating an area of the current collector foil with an electrode coating;

embossing a non-linear embossed pattern onto an area of the current collector foil without the electrode coating, wherein the area of the current collector foil without the electrode coating includes a first row of first features comprising protrusions disposed along a first axis parallel to a boundary between the coated area and the area of the current collector foil without the electrode coating, a second row of second features comprising depressions disposed along a second axis parallel to the boundary between the coated area and the area of the current collector foil without the electrode coating, and a third row of features comprising alternating protrusions and depressions (1) disposed between the first row and the second row and (2) aligned along a third axis parallel to the boundary between the coated area and the area of the current collector foil without the electrode coating, each of the protrusions and the depressions positioned in the area of the current collector foil without the electrode coating having a depth in a range of 1 μm to 1500 μm and a width in a range of 0.1 mm to 10 mm; and applying pressure to the electrode coating.

9. The method of claim 8, comprising:

forming an electrode tab from the current collector foil without the electrode coating.

10. The method of claim 8, comprising:

forming an electrode from an electrode tab and the current collector foil with the electrode coating.

11. The method of claim 8, comprising:

disposing at least a portion of the non-linear embossed pattern onto the area of the current collector foil without the electrode coating to cover at least a portion of a wrinkle of the current collector foil.

12. The method of claim 8, comprising:

increasing a mechanical strength of at least a portion of the current collector foil.

13. The method of claim 8, wherein the area of the current collector foil with the electrode coating is a first area, the method comprising:

coating a second area of the current collector foil with the electrode coating; and disposing the non-linear embossed pattern between the first area and the second area.

14. The method of claim 8, comprising:

disposing the non-linear embossed pattern along an axis parallel to a boundary of the area of the current collector foil with the electrode coating.

15. A battery, comprising:

a current collector foil, comprising:

a coated area comprising an electrode coating; and an uncoated area comprising tabs having an embossed pattern including a first row of first features comprising protrusions disposed along a first axis parallel to a boundary between the coated area and the uncoated area, a second row of second features comprising depressions disposed along a second axis parallel to the boundary between the coated area and the uncoated area, and a third row of features comprising alternating protrusions and depressions (1) disposed between the first row and the second row and (2) aligned along a third axis parallel to the boundary between the coated area and the uncoated area, each of the protrusions and the depressions positioned in the uncoated area having a depth in a range of 1 μm to 1500 μm and a width in a range of 0.1 mm to 10 mm.

16. The apparatus of claim 1, wherein the protrusions and depressions positioned in the uncoated area have different depths.

17. A system, comprising:

the apparatus of claim 1; and an optical element configured to:

detect the embossed pattern; and use the embossed pattern to locate at least one of an edge of the coated area or an edge of the uncoated area.

18. The system of claim 17, wherein the optical element comprises at least one of: a camera, a vision system, a scanner, or a combination thereof.

19. The apparatus of claim 1, wherein the coated area is not embossed.

20. The apparatus of claim 1, wherein the first row of first features comprises only protrusions and the second row of second features comprises only depressions.

* * * * *